(12) United States Patent
Wakonig

(10) Patent No.: US 12,021,480 B2
(45) Date of Patent: Jun. 25, 2024

(54) DEVICE FOR ATTACHING TO A NOISE BARRIER

(71) Applicant: Martin Wakonig, Vienna (AT)

(72) Inventor: Martin Wakonig, Vienna (AT)

( * ) Notice: Subject to any disclaimer, the term of this patent is extended or adjusted under 35 U.S.C. 154(b) by 383 days.

(21) Appl. No.: 17/284,968

(22) PCT Filed: Oct. 17, 2019

(86) PCT No.: PCT/AT2019/060345
§ 371 (c)(1),
(2) Date: Apr. 13, 2021

(87) PCT Pub. No.: WO2020/077377
PCT Pub. Date: Apr. 23, 2020

(65) Prior Publication Data
US 2021/0359637 A1    Nov. 18, 2021

(30) Foreign Application Priority Data
Oct. 17, 2018  (AT) .............................. A 50901/2018

(51) Int. Cl.
*H02S 20/21*    (2014.01)
*E01F 8/00*    (2006.01)
(Continued)

(52) U.S. Cl.
CPC ............ *H02S 20/21* (2014.12); *E01F 8/0005* (2013.01); *E01F 8/0023* (2013.01); *F24S 2020/183* (2018.05)

(58) Field of Classification Search
CPC ........ H02S 20/21; H02S 20/26; E01F 8/0005; E01F 8/0023; E01F 8/0011; E01F 8/0017; E01F 8/0088; F24S 2020/183; F24S 25/61; F24S 25/613; F24S 25/615; F24S 25/617; F24S 25/63
(Continued)

(56) References Cited

U.S. PATENT DOCUMENTS 2,126,511 A * 8/1938  Soule .................... E04B 2/58
                                                        52/657
4,370,843 A * 2/1983  Menge ................... E04C 3/292
                                                        52/657
(Continued)

FOREIGN PATENT DOCUMENTS

CN    102027298 A    4/2011
CN    107313372 A    11/2017
(Continued)

OTHER PUBLICATIONS 5 page PDF of an English translation of the written opinion dated Mar. 18, 2021 for PCT/AT2019/060345. (Year: 2021).*
(Continued)

*Primary Examiner* — Robert Canfield
(74) *Attorney, Agent, or Firm* — Pearne & Gordon LLP

(57) ABSTRACT

A device is provided for vertically attaching to a wall, in particular to a noise barrier, including a frame and at least two tins which have solar panels and are provided on a front face of the frame, wherein at least two supporting projections, each with a bearing for supporting the frame, extend outwards from a rear face of the frame, the fins forming elongate frame struts.

18 Claims, 9 Drawing Sheets

(51) Int. Cl.
*E04B 1/74* (2006.01)
*F24S 20/00* (2018.01)
*H02S 20/26* (2014.01)

(58) Field of Classification Search
USPC .................................................. 52/291, 657
See application file for complete search history.

(56) References Cited

U.S. PATENT DOCUMENTS

| | | | | |
|---|---|---|---|---|
| 4,585,129 | A * | 4/1986 | Lundqvist | A47B 96/00 |
| | | | | 29/446 |
| 4,723,374 | A * | 2/1988 | Peterson | E06B 11/045 |
| | | | | 49/404 |
| 4,878,700 | A * | 11/1989 | Brune | H05K 7/183 |
| | | | | 292/241 |
| 5,491,949 | A * | 2/1996 | De Moor | E04H 5/12 |
| | | | | 52/657 |
| 6,892,504 | B1 * | 5/2005 | diGirolamo | E04C 2/384 |
| | | | | 52/657 |
| 6,920,724 | B1 * | 7/2005 | Hundley | E04B 1/24 |
| | | | | 52/656.1 |
| 7,891,152 | B2 * | 2/2011 | Yu | E06B 11/045 |
| | | | | 52/657 |
| 8,276,328 | B2 * | 10/2012 | Pepin | E04B 1/34838 |
| | | | | 52/657 |
| 2002/0190617 | A1 * | 12/2002 | Banicevic | F25D 23/02 |
| | | | | 52/657 |
| 2011/0017276 | A1 | 1/2011 | Boffa et al. | |
| 2011/0056534 | A1 | 3/2011 | Ding et al. | |
| 2014/0014165 | A1 * | 1/2014 | Echizenya | F24S 25/617 |
| | | | | 136/251 |
| 2014/0116497 | A1 | 5/2014 | Sanders | |
| 2015/0136208 | A1 | 5/2015 | Park | |
| 2016/0340959 | A1 | 11/2016 | Valinejadshoubi et al. | |
| 2019/0158013 | A1 * | 5/2019 | Boguess | H02S 20/30 |
| 2022/0010549 | A1 * | 1/2022 | Thompson | B32B 3/08 |
| 2022/0034052 | A1 * | 2/2022 | Wakonig | E01F 8/0023 |
| 2022/0376647 | A1 * | 11/2022 | Wakonig | E01F 8/0023 |

FOREIGN PATENT DOCUMENTS

| | | | |
|---|---|---|---|
| DE | 87 06 878 U1 | 8/1987 | |
| DE | 20 2010 011 319 U1 | 10/2010 | |
| DE | 20 2011 101 835 U1 | 9/2012 | |
| EP | 1 788 155 A2 | 5/2007 | |
| EP | 1 837 443 A1 | 9/2007 | |
| EP | 2 645 013 A1 | 10/2013 | |
| JP | H08-120625 A | 5/1996 | |
| JP | 2005347724 A * | 12/2005 | F24J 2/523 |
| WO | 2017/091077 A1 | 6/2017 | |

OTHER PUBLICATIONS 5 page PDF titled Angle Iron vs. Square Tubing: A Strength Comparison, found at https://www.mchoneind.com/angle-iron-vs-square-tubing-a-strength-comparison/. (Year: 2020).*
International Search Report from Corresponding International Application No. PCT/AT2019/060345 dated Mar. 16, 2020.
Written Opinion from Corresponding International Application No. PCT/AT2019/060345 dated Mar. 16, 2020, Jul. 24, 2023.
Office Action issued in corresponding Chinese application, 201980068931.6; dated Dec. 27, 2023.

* cited by examiner

DEVICE FOR ATTACHING TO A NOISE BARRIER

CROSS-REFERENCE TO RELATED APPLICATIONS

This is a National Stage application of PCT international application PCT/AT2019/060345 filed on Oct. 17, 2019, which claims the priority of Austrian Patent Application No. A 50901/2018, filed Oct. 17, 2018, which are incorporated herein by reference in their entireties.

FIELD OF THE INVENTION

The invention relates to a device for vertical attachment to a wall, in particular to a noise barrier, comprising a frame and at least two fins with solar panels arranged on a front side of the frame, wherein at least two supporting projections each having a bearing for supporting the frame extend outwards from a rear side of the frame.

BACKGROUND OF THE INVENTION

A linking of solar modules to noise protection components and the associated general advantages have fundamentally been known for some time. A basis problem with this linking consists in that the surface of solar panels is generally sound-reflecting and therefore is diametrically opposite to the desired properties of a noise protection component.

EP 2 645 013 A1 discloses a system of solar panels which is configured for application on a vertical surface and comprises a plurality of rows of solar panels which are each arranged on a supporting frame. Furthermore, the system comprises a plurality of rows of frames which are arranged parallel to the supporting frame and serve as supports for diffuser panels which are arranged on the frame, wherein light which is reflected to the diffuser panel from the solar panel arranged in each case underneath a diffuser panel is scattered by the diffuser panels.

US 2015/136208 A1 discloses a solar module holder comprising a plurality of vertical frames and upper transverse members which are arranged in a plurality of stages between the vertical frames, in order to be separated horizontally from the vertical frames. The solar module holder further comprises a plurality of horizontal supports and solar modules, wherein the horizontal supports are arranged between the vertical frames in the lower regions of the upper transverse supports and in the front areas of the vertical frames in order to be separated horizontally from the vertical frames.

DE 87 06 878 U1 discloses a protective element for a building area which can be configured as a facade cover panel. In this case, the facade cover panel can be arranged on a balcony with the aid of a retaining frame and a balcony fixing in order to arrange the facade cover panel on a perpendicular panel.

EP 1 788 155 A2 discloses an ecological noise barrier in lightweight construction comprising vertical supports anchored in a foundation and wedge-shaped sound-dampening elements which comprise a sound-absorbing sound-dampening material and a roofing to protect against influences of weather. In this case, the sound-dampening material consists of natural and renewable raw materials made of straw, haulm or fibres of plant origin.

WO 2017/091077 A1 describes a solar shading module which can be used as part of a noise barrier along a motorway. The solar shading module comprises shading panels which can be arranged on a framework between two transparent walls and which can contain photovoltaic cells in order to convert the radiation energy of the solar rays impinging upon the shading panels into electrical energy. A solar tracking system according to WO 2017/091077 A1 is used to move the shading panels so that these are aligned towards the sun. A disadvantage here is the complex construction which is necessitated by the trackability of the individual shading panels.

BRIEF SUMMARY OF THE INVENTION

It is an object of the invention to eliminate or at least reduce the disadvantages of the prior art.

The invention provides a device of the type mentioned initially wherein the fins form elongate frame struts. The fins are in this case both supporting structure for the solar panels and also frame struts. As a result, the frame can be structurally reinforced with the aid of the fins. Specifically provided supporting structures and complex constructions for connecting these supporting structures to the frame can thus be saved and the cross-section of the frame can have smaller dimensions. This saves costs and reduces the visible surface of the device in the viewing direction normally onto a frame plane so that when the device according to the invention is attached to the wall, the surface of the wall behind the device which can be reached directly for incoming sound is reduced as little as possible in order to keep the effective sound absorption surface of the wall as large as possible. The visible surface corresponds to the area of a projection of the device in the frame plane.

Another possible advantage of the present disclosure which results from the small visible surface is that the device is particularly suited for use on an at least partially transparent noise barrier. In the viewing direction parallel to the sound (e.g. for occupants of a noise-inducing vehicle) the view through the noise barrier is only slightly restricted by the device and the advantages of an outlook onto the surrounding scenery are largely retained.

Another possible advantage of the present disclosure is that the device can be attached to existing or newly erected walls without an additional upright construction and foundation being necessary and with only slight additional loading of the wall. In particular, by means of an attachment with the aid of the two supporting projections each with a bearing, vertical loads can be diverted via existing or new uprights of the existing or new walls via the bearings. Furthermore, a simple and cost-effective pre-fabrication of the device and a simple assembly of the pre-fabricated elements can be made possible. For example, the solar panels can already be electrically connected during pre-fabrication so that the device can be installed rapidly with comparatively few common electrical connections. In addition, the device can easily be exchanged in the case of repairs and damage.

Optionally the fins can be arranged substantially parallel. As a result, the effective surface area of the solar panels which are arranged on the fins can be maximized. That is, the largest possible area of the photovoltaic cells of the solar panels can be used for the impingement of light rays. For example, the visible surface of the device can be maximized in the viewing direction from a predicted average angle of incidence of solar rays so that neighbouring fins in this view directly adjoin one another. As a result of the parallel arrangement, a substantially continuous useful area can thus be achieved. At the same time, a shading of the solar panels by neighbouring fins is minimized. For example, the fins can be arranged substantially parallel to a horizontal edge of the device in use. In this case, the fins can be arranged substantially parallel to a connecting line between the two supporting projections. This has the advantage that when several devices are arranged side by side, the impression of continuous fins is given. For a reference of moving observers to the devices, the arrangement of the fins in relation to far-removed observation points additionally remains stable so that the parallel horizontal arrangement is particularly suitable for use on an at least partially transparent wall.

In addition, at least three fins with solar panels can be arranged on the front side of the frame at equal distances. Advantageously, a simplified manufacturing and assembly process of the frame is obtained as a result of the uniform distances. Furthermore, as a result the fins can be configured to be the same without adversely affecting the useful area, with the result that the manufacturing methods and costs of the fins can be simplified or reduced. Finally the arrangement at uniform distances also contributes to minimizing the visual impairment when used on a transparent noise barrier because a uniform arrangement is less striking than a non-uniform arrangement and is perceived less by the human eye or can be faded out better.

The solar panels can be arranged on the fins at an oblique angle in relation to a frame plane. In this way the solar panels can be arranged at an angle at which the efficiency of the solar panels is greatest. As a result of the angle of incidence of the light which changes over the course of the day, an arrangement of the solar panels is obtained which, calculated over the entire year, results in a maximum absorption of the solar radiation. In order not to adversely affect this absorption efficiency, the vertical distance between solar panels arranged on two adjacent parallel fins is advantageously selected so that the upper edge of the solar panel which is arranged on the lower fin does not exceed the imaginary shadow line starting from the lower edge of the solar panel, which is arranged on the upper fin, and normal to the surface of the solar panel.

In order to increase the stiffness, the fins can each have at least one bracing which is angled in relation to the solar panel. In this case, the fins, for example, have a two-legged (e.g. V- or L-shaped) or multi-legged profile, wherein the solar panel is arranged on one of the two flat parts of the profile and the other (optionally also flat) part which forms the bracing prevents torsion and/or bending of the fins. As a result of the bracing, the fins can be dimensioned with a smaller thickness. This serves both to save material and therefore costs and also to reduce the overall weight of the device. A low overall weight increases the compatibility of the device with existing walls, in particular noise barriers because the requirements for the additional load they can receive are thereby reduced.

Optionally the fins are coated with a sound-absorbing surface and/or covered with a sound-absorbing material at least in sections. Advantageously the sound absorption capacity of the device according to the invention is thereby increased since sound coming directly from a noise source or sound reflected at a solar panel or at a (e.g. partially transparent) noise barrier can be absorbed. The sound-reflecting effect of solar panels can thereby be at least partially compensated and the degree of sound absorption of the wall can be improved overall.

The invention also relates generally to a device for vertical attachment to a wall, in particular to a noise barrier, comprising a frame and at least two fins arranged on a front side of the frame, wherein the fins form elongate frame struts and are provided, at least in sections, with a sound-absorbing coating and/or covered with sound-absorbing material wherein at least two supporting projections each having a bearing for mounting the frame extend outwards. Such a fin device can also advantageously be used generally without solar panels, e.g. in order to improve the sound absorption behaviour of an otherwise predominantly sound-reflecting noise barrier (possibly a transparent noise barrier). Accordingly, the invention also relates to a noise barrier having at least one such fin device.

Furthermore, lugs projecting laterally of the bearing can be provided on the supporting projections for connection to a support, wherein the lugs are preferably arranged parallel to the frame plane. As a result of a connection of the lugs to a support, any horizontal slippage of the bearing can be avoided. In addition, a simple assembly of the device according to the invention on a support which can be part of the wall is ensured. The lugs can, for example, form stops which are arranged at a defined distance outside the frame and predefine a corresponding distance between the frame and a wall carrying the device.

According to one optional embodiment, at least one spacer extends from the rear side of the frame outwards. Advantageously with the aid of the spacer, wind loads of the device according to the invention can be introduced into the existing or new noise barrier with the result that the device can be kept at a distance from a supporting wall and can be dimensioned more delicately so that material and costs can subsequently be saved and weight can be reduced.

Alternatively or additionally, the frame can be formed from moulded tubes and/or angles, in particular made of metal. As a result, the frame can be produced cost-effectively from a high-strength material. In addition, a comparatively high structural integrity of the frame is achieved with at the same time lower expenditure on material and lower weight.

Furthermore, the frame can have at least one tension diagonal. A plurality of, for example, crossing-over, tension diagonals can also be provided. The tension diagonal improves the stability of the device against parallel displacements which, for example, can occur during transport of the frame before attachment to the wall. If the tension diagonal is made of metal, particularly high tensile forces can be absorbed. For example, the tension diagonal can be formed by at least one wire cable running obliquely to the fins, which is fastened to opposite legs of the frame.

According to a preferred embodiment, the supporting projections are adapted for connection to corresponding supporting projections of a second device of the same type. Preferably the device is attached vertically to a first side of a wall and the second device of the same type is attached vertically to a second side of the wall opposite the first side and is mirror-imaged to the first device via the wall. The supporting projections of the two devices can extend over the upper edge of the wall here and contact one another.

In this connection, the supporting projections can be adapted to produce a screw and/or plug-in connection. Advantageously with the aid of the screw and/or plug-in connections, the supporting projections of a device according to the invention can be connected simply, stably and detachably to corresponding supporting projections of a second device of the same type. As a result, a rapid and reliable assembly and disassembly (for example, for maintenance) is made possible.

The invention further relates to a wall, in particular noise barrier with a device according to one of the variants described above mounted thereon. In this case, the device is attached vertically to the wall wherein at least two supporting projections each having a bearing for mounting the frame extend outwards to the wall from the rear side of the frame. The bearings can in this case rest on corresponding location points or bearing surfaces of the wall, for example, on an upper edge, on a horizontal transverse member or in a recess of the wall.

The incoming sound (sound immission) reaches the sound absorption surface of the wall directly but not necessarily horizontally (normally to the vertical). Since most of the sound immission is expected from a relatively small region of the solid angle, it is advantageous if the surface area of those sections of the sound absorption surface of the present wall which can be reached directly for sound incoming from a noise immission region is at least as large as the surface area of a visible area of the wall, wherein the noise immission region comprises an angular region between a horizontal and an inclination inclined by 70° from this horizontal in the direction of an underside of the wall. Optionally the above condition for the surface area of the sections of the sound absorption surface is already satisfied by a noise immission region having an angular region between a horizontal (hereinafter for short the horizontal is designated as) 0° and an inclination inclined by 60° from this horizontal in the direction of an underside of the wall element or with an angular region between 0° and 50° or with an angular region between 0° and 40° or with an angular region between 0° and 30° or with an angular region between 0° and 20° or with an angular region between 0° and 10°.

Preferably the fins of the wall according to the invention are provided, at least in sections, with a sound-absorbing surface and/or covered with a sound-absorbing material, wherein the total area of the sound-absorbing material or coating of the wall according to the invention in relation to the visible area of the wall corresponds approximately to the ratio 1.2:1. The sound-reflecting effect of the solar panels of the wall according to the invention can thereby be compensated and the degree of absorption of the sound can be improved compared with a conventional noise barrier (without pre-mounted device).

According to a preferred embodiment, the disclosed wall, in particular noise barrier, comprises two devices according to one of the above-described variants mounted and connected thereon. For example, in this case a first device can be attached vertically to a first side of the wall and a second device can be attached vertically to a second side of the wall opposite the first side and mirror-imaged to the first device via the wall, wherein the two devices can optionally be connected via a screw and/or plug-in connection.

According to a further embodiment, the wall or noise barrier can be at least partially transparent. Advantageously as a result, new transparent noise barriers can be installed, for example in those areas of roads and rails in which this was hitherto only possible to a restricted extent as a result of the comparatively poorer sound absorption of the transparent noise barriers. In this case, as a result of the fins arranged at an oblique angle, non-transparent commercially available solar panels with transparent noise protection can be used without losing the transparent property from the viewing direction of the observer of the noise barriers.

BRIEF DESCRIPTION OF THE DRAWINGS

The invention is explained in further detail hereinafter with reference to particularly preferred exemplary embodiments to which it should not however be restricted and with reference to the drawings. In the drawings in detail.

DESCRIPTION OF EXAMPLE EMBODIMENTS

Figure 1:
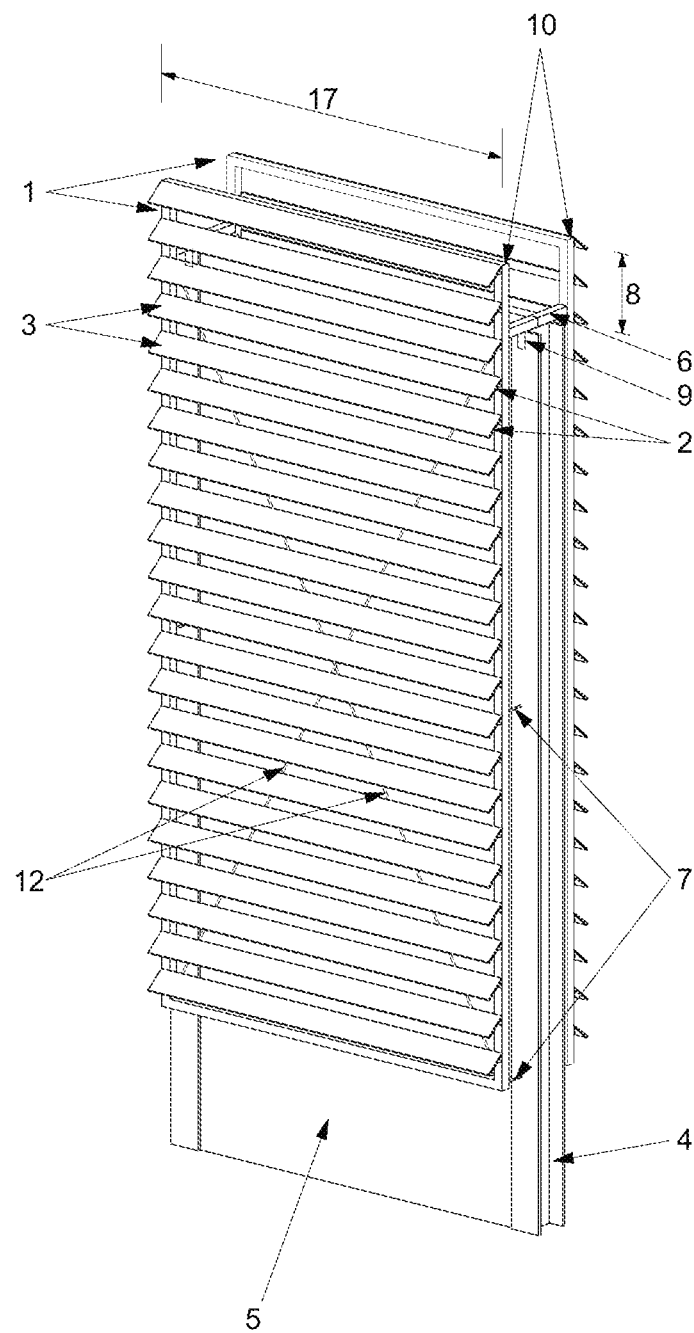
FIG. 1 shows a diagrammatic view of a first embodiment of the invention with a noise barrier having presently disclosed devices arranged on both sides.
Figure 2:
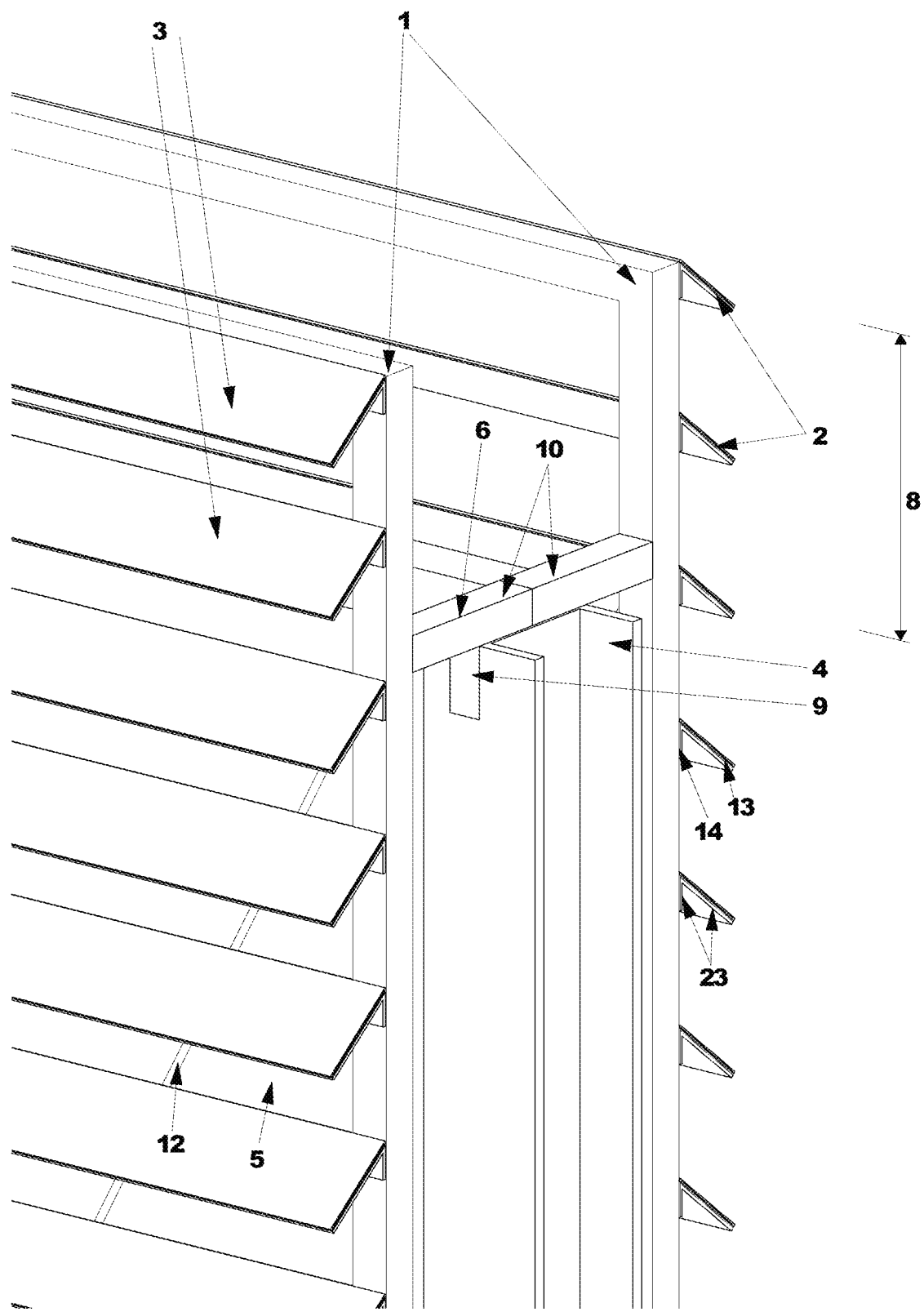
FIG. 2 shows a detail of the diagrammatic view according to FIG. 1.
Figure 3:
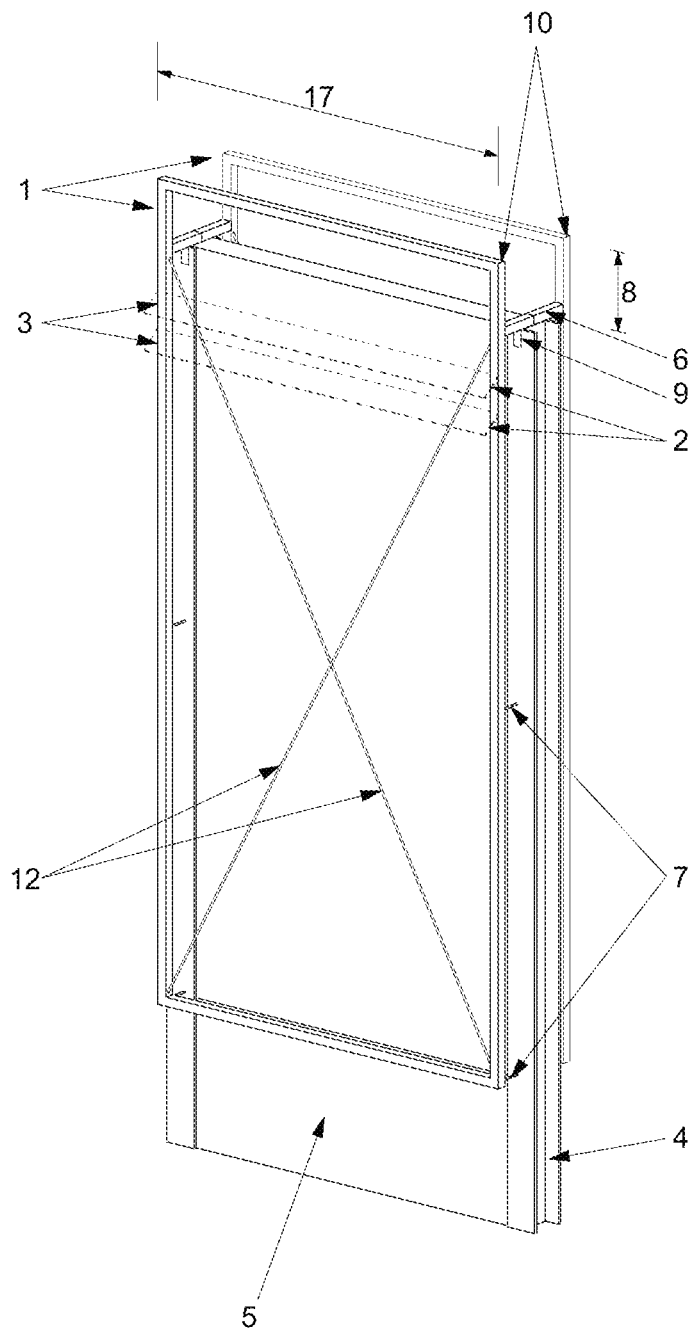
FIG. 3 shows a diagrammatic view as according to FIG. 1, wherein only two fins are indicated to illustrate the frame.

FIGS. 1 to 5 show a first embodiment of the invention with a noise barrier 5. The noise barrier 5 is divided into sections in the longitudinal direction (i.e. according to the width 17) which are each delimited by an upright 4 made of metal, supported and anchored in the ground. FIGS. 1 to 3 show such a section of the noise barrier 5. The noise barrier 5 can be continued in the longitudinal direction by sections of the same type.

A device 10 comprising a frame 1, comprising fins 2 and comprising solar panels 3 is attached vertically in each case on two outer sides of the noise barrier 5 which extend in the longitudinal direction and in a vertical direction. The frame 1 has a rectangular frame construction comprising two vertical and two horizontal moulded tubes made of metal. The frame 1 extends in the longitudinal direction over the entire width 17 of a section of the noise barrier 5 and in the vertical direction at a distance from a lower edge of the noise barrier as far as beyond the upper edge of the noise barrier 5.

Figure 6:
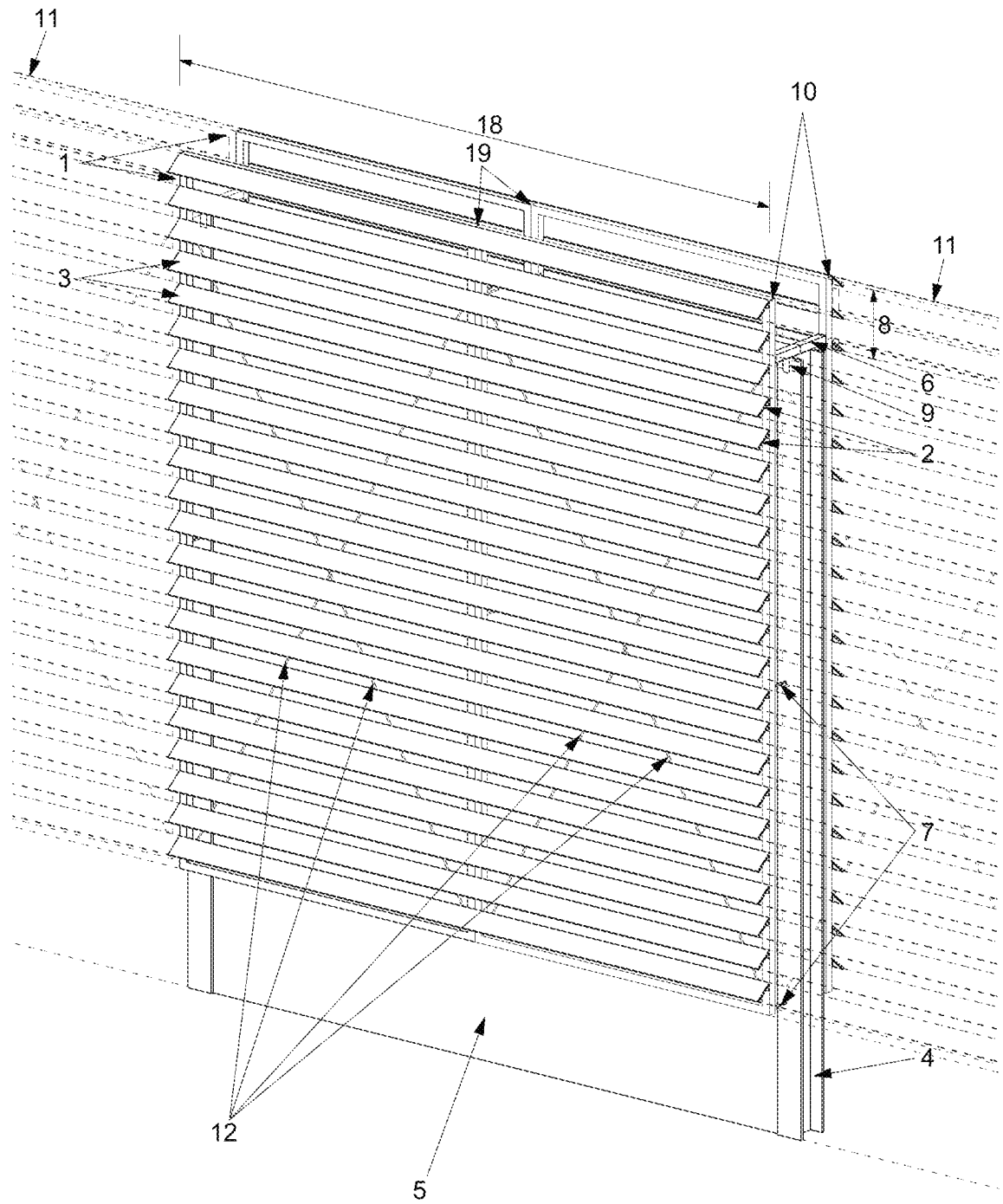
FIG. 6 shows a diagrammatic view of a second embodiment of the invention with a wider noise barrier with presently disclosed devices arranged on both sides.
Figure 7:
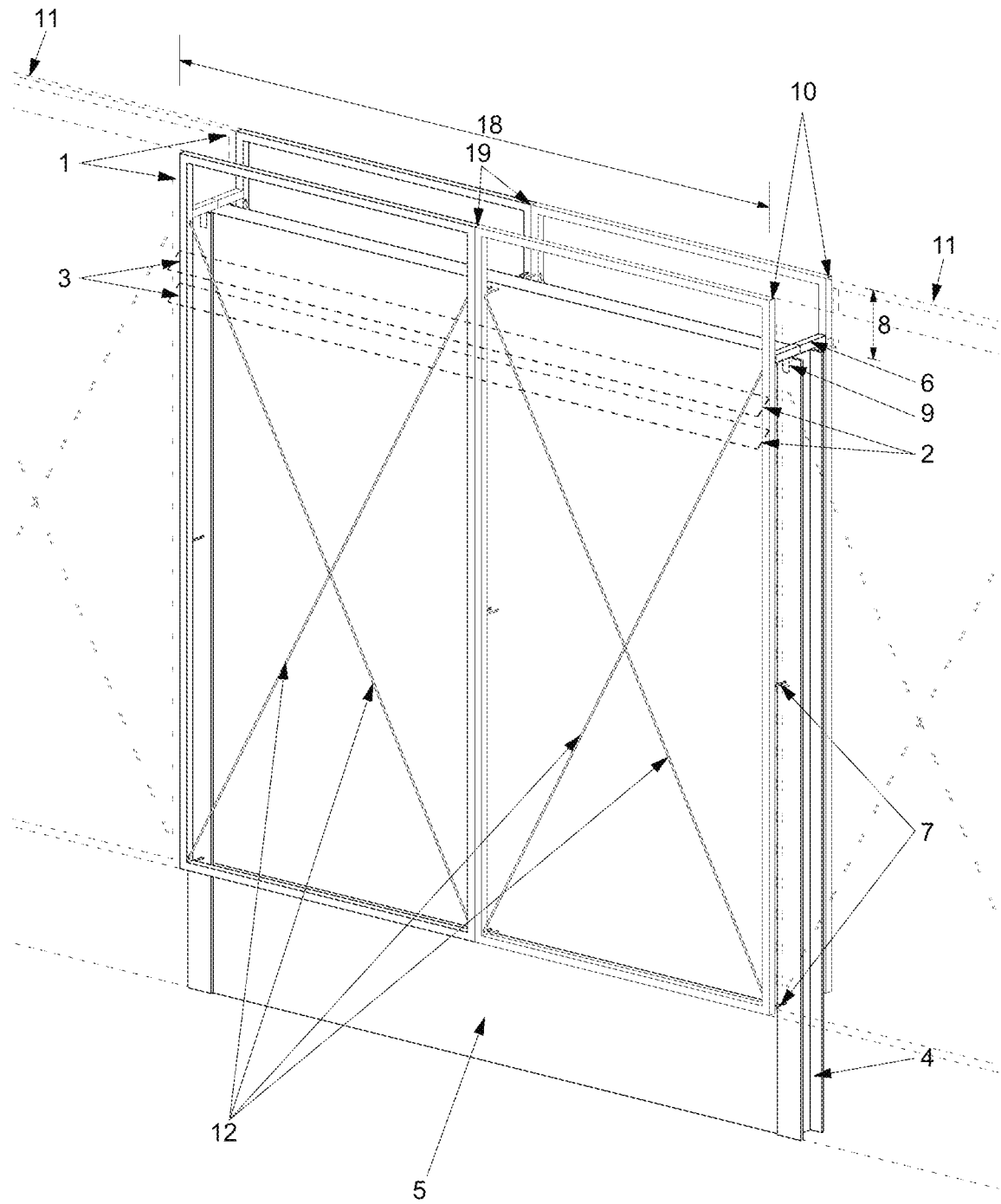
FIG. 7 shows a diagrammatic view as according to FIG. 6, wherein only two fins are indicated to illustrate the frame.

A total of twenty-two fins 2 are arranged horizontally and parallel on a front side of the frame 1, which fins extend in the longitudinal direction (horizontally) over the entire width of the frame 1 and form elongate frame struts. The fins 2 are connected to the frame 1, more precisely to the outer vertical moulded tubes and fastened thereon. The distance between neighbouring fins 2 is constant and all the fins 2 are arranged at uniform distances (i.e. in each case at the same distance from respectively neighbouring fins). The width of the frame 1 which corresponds to the width 17 of a section of the noise barrier 5 is determined according to the usual distances of the uprights 4 of existing noise barriers which, for example, is about 165 cm, about 200 cm or about 250 cm. In the case of larger distances of the uprights 4 of, for example, about 500 cm, as shown in FIGS. 6 and 7, two frame structures are connected to form a frame 1.

The fins 2 are arranged at an oblique angle in relation to a frame plane which, in the embodiment shown, is parallel to the outer side of the noise barrier 5 (cf. FIGS. 4 and 5) so that the fins 2 are inclined in relation to a vertical in the direction of an upper side of the noise barrier 5. Solar panels 3 comprising photovoltaic cells in series arrangement, which have a width of about 12.5 cm or alternatively of about 16.5 cm are fastened to the fins 2. On the rear side of the frame 1 facing away from the fins 2, which faces the noise barrier 5, supporting projections 6 extend outwards in the direction of the noise barrier 5 on the two vertical moulded tubes of the frame 1 in each case in the region of an upper edge of the noise barrier 5 so that the supporting projections 6 rest on an upper side of the noise barrier 5 with respectively one bearing for mounting the frame 1, more precisely on the upper end of the upright 4. In this way, the weight of the device can be diverted via the supporting projections 6 and via the uprights 4. Wind loads on an outer side of the device can be introduced into the noise barrier 5 via additional spacers 7 in the form of screw connections which are each arranged in an upper, middle and lower region of the two vertical moulded tubes of the frame 1, which extend outwards from the rear side of the frame 1 and contact the noise barrier 5, more precisely the uprights 4. The arrangement of the supporting projections 6 makes it possible to produce frames 1 which project beyond the height of the noise barrier 5.

In the first embodiment of the frame 1 shown in FIGS. 1 to 5, the frame 1 projects by an excess height 8 beyond the noise barrier 5. The extent of the maximum possible excess height is determined according to the statical properties of the noise barrier 5 and in particular those of the uprights 4. Noise barriers can thus be used as existing surface resources for energy recovery by means of photovoltaic cells and as substructure maximally for energy recovery by means of photovoltaic cells according to the existing static properties of these noise barriers. Lugs 9 projecting laterally of the bearings are arranged on the supporting projections 6, by means of which the frame 1 is connected to the uprights 4 with the aid of a plug-in connection or screw connection. The uprights 4 here serve as supports for the device. The lugs 9 are in this case arranged parallel to the frame plane. In addition, the frame 1 is additionally stabilized by tension diagonals 12 made of metal which run diagonally through the rectangular frame and together form an X. Furthermore, the arrangement of the tension diagonals 12 facilitates transport during and after pre-fabrication.

FIG. 3 shows a diagrammatic view of the first embodiment wherein in each case only two fins are indicated by dashed lines. For simplicity the other fins are masked out to make the structure of the frame 1 clear. In the embodiment shown, the frame 1 is fastened to the uprights 4 of the noise barrier 5 with the aid of the supporting projections 6 and spacers 7 so that the simple assembly of the device according to the invention is illustrated. The supporting projections 6 of the same type of the devices 10 arranged on both sides of the noise barrier 5 are connected to one another by means of plug-in connections. The arrangement of the tension diagonals 12 inside the moulded tubes can also be identified particularly clearly in FIG. 3.

Figure 4:
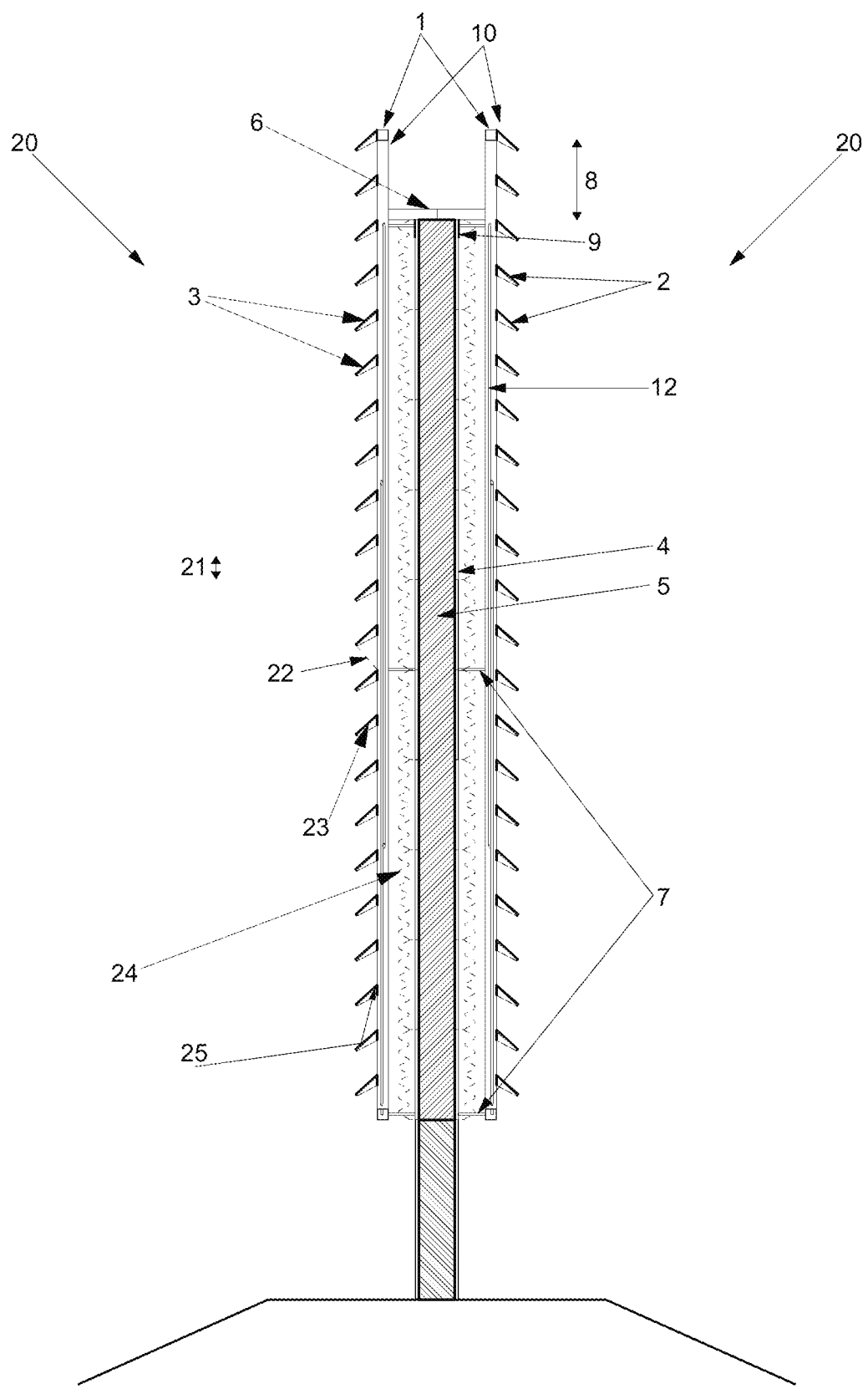
FIG. 4 shows schematically a vertical section of the first embodiment according to FIGS. 1 to 3.

FIG. 4 shows schematically a vertical section of the first embodiment according to FIGS. 1 to 3 and FIG. 5 shows a detail from FIG. 4 in the region of the upper edge of the noise barrier 5. As can be seen from these figures, in this embodiment the noise barrier 5 comprises an inner region of ferroconcrete and an outer region of wood concrete, wherein the external surface of the wood concrete elements (shown by dashed lines) is wave-shaped. In general, the noise barrier within the scope of the invention can be an existing or newly erected noise barrier of any type, for example, structured or non-structured wood concrete with light-weight core or a noise barrier made of wood or of aluminium, e.g. with aluminium perforated plate. The individual fins 2 of the device comprise in cross-section a part 13 inclined with respect to the horizontal (normally to the outer side of the noise barrier or to the frame plane of the frame 1) as a bearing for the solar panels 3 and a vertical part 14 adjacent to the part 13 inclined with respect to the horizontal as stiffening and load diversion of the photovoltaic cells of the solar panels 3 into the frame 1. The vertical part 14 provided as stiffening is in this case angled in relation to the solar panel. The fins 2 are fastened with the vertical parts 14 on the outer vertical moulded tubes. In order to reduce the material thickness of the individual fins 2, the fins 2 in cross-section additionally have a bevelling 15 which adjoins the part 13 inclined with respect to the horizontal on the opposite side of the vertical part 14. In order to reduce the material thickness of the individual fins 2, stiffening plates 16 can additionally be provided at the bearing points or at regular intervals according to static requirements.

The angle of the part 13 inclined with respect to the horizontal in relation to the frame plane is selected so that the solar panel 3 mounted thereon on an upper side of the inclined part 13 averaged over the entire year is directed normally to the direction of the sunlight 20 so that, calculated over the entire year, a maximum achievable efficiency for energy recovery from light and sun according to compass direction is obtained. In order not to adversely affect this efficiency, a vertical distance 21 between two superposed parallel rows of fins 2 is selected so that the upper edge of the photovoltaic cells of the lower solar panel 3 does not exceed the imaginary shadow line 22 starting from the lower edge of the photovoltaic cell of the upper solar panel 3 normal to the surface of the photovoltaic cell. In this case, the bevelling 15 is arranged inside the shadow line 22. The used surfaces (for sound absorption) of the noise barrier 5 in relation to the used surfaces (for light absorption) of the photovoltaic cells of the solar panels 3 are thus maximally utilized according to the attainable efficiency for energy recovery from light and sun.

Figure 5:
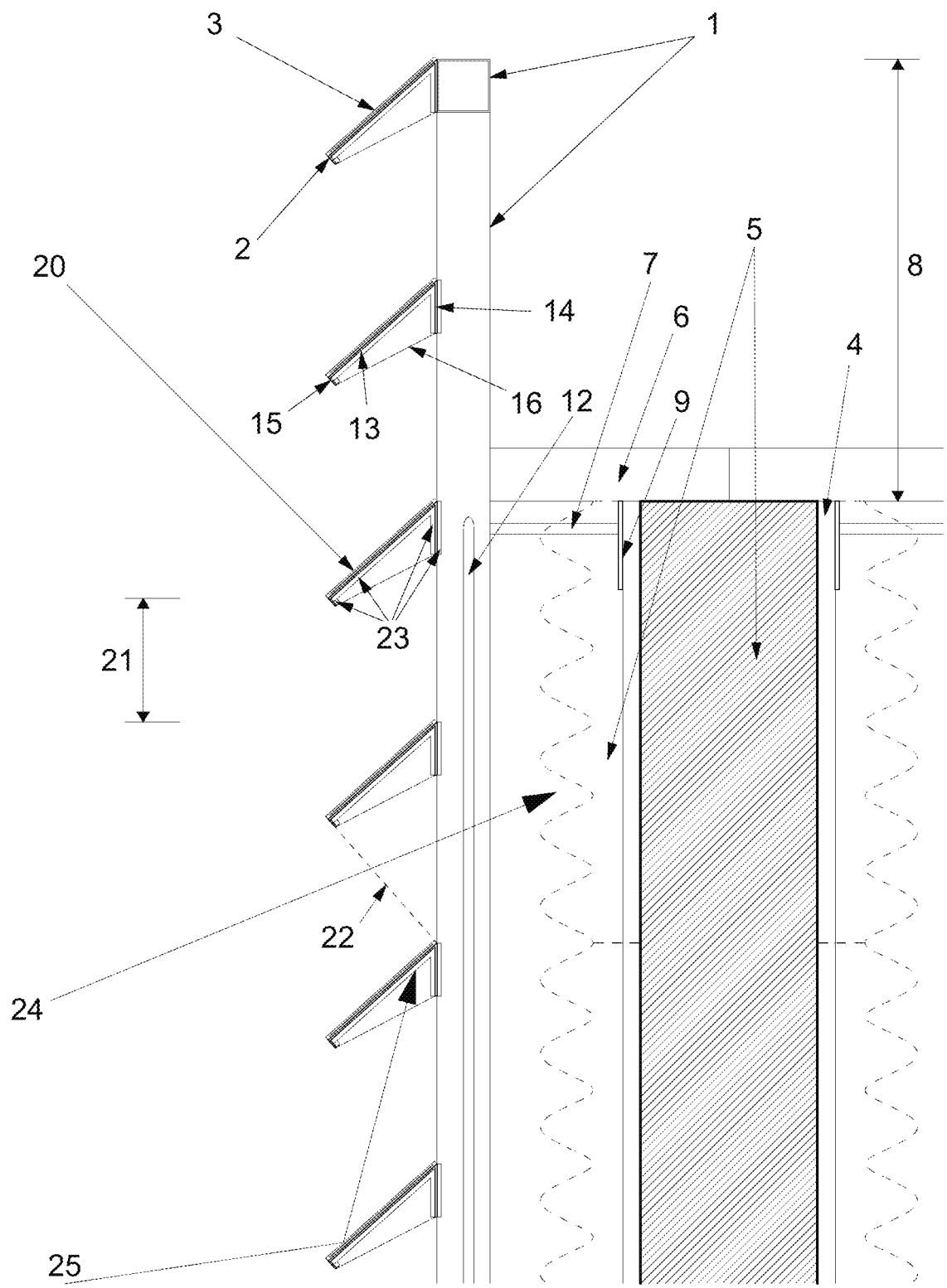
FIG. 5 shows schematically a detail of the vertical section according to FIG. 4.

The underside of the part 13 inclined with respect to the horizontal and also the bevelling 15 in the embodiment shown according to FIG. 5 are provided with a sound-absorbing coating 23 (or coated with a sound-absorbing surface) in order to be able to absorb sound incoming directly 24 or indirectly 25 from a noise source. In the embodiment shown, the total area of the sound-absorbing material of the coating 23 in relation to the visible area of the existing noise barrier approximately corresponds to the ratio 1.2:1. The sound-reflecting effect of the photovoltaic cells of the solar panels 3 can thus be compensated and the degree of sound absorption of the noise barrier can furthermore be improved.

In the embodiment shown according to FIG. 5, the supporting projections 6 of the device on one side of the noise barrier 5 are connected to the supporting projections 6 of the device on the other side of the noise barrier 5, wherein the supporting projections 6 of the two devices rest with respectively one bearing on the upper edge of the noise barrier 5, more accurately on the upper edge of the uprights 4 of the noise barrier. Underneath the supporting projections 6 vertical lugs 9 are arranged laterally of the bearings of the supporting projections 6, which are connected to the uprights 4 with the aid of a plug-in connection or screw connection. Spacers 7 are also arranged under the supporting projections 6 between the vertical lugs 9 and the frame 1.

FIG. 6 shows a part of a second embodiment of the invention. The noise barrier 5 shown comprises a plurality of adjacent sections in the longitudinal direction which each correspond to the section shown which is delimited by two uprights 4. The sections 11 adjacent to the section shown are indicated in FIG. 6 by dashed lines in order to illustrate the continuation of the noise barrier by repetition in rows or juxtaposition of several sections. One device according to the invention, comprising a frame 1 and fins 2, is arranged vertically in each case on the two outer sides of the section of the noise barrier 5. As a result of a greater width 18 of the section in the second embodiment according to FIG. 6 compared with the first embodiment according to FIGS. 1 to 5, the frame 1, which extends in the longitudinal direction over the entire width 18 of the section, comprises two rectangular frame constructions each comprising two vertical and two horizontal moulded tubes, which are made of metal. With the aid of simple screw connections or plug-in profiles of the two rectangular frame constructions on two vertical sides 19 directed towards one another, the tension diagonals 12 can be used as tension rods for load removal of the greater distance of the two uprights 4 with respect to the first embodiment without needing to increase the dimension of the individual frame constructions themselves. The fins 2 can be provided as continuous frame struts or each assigned to a frame construction and continued in row form. The two vertical moulded tubes arranged on the outer vertical edges of the device each have one supporting projection extending from the rear side outwards to the noise barrier with respectively one bearing for mounting the frame. In the region of the vertical sides 19 directed towards one another and along the outer vertical moulded tubes, spacers 7 are provided which extend from the frame 1 to the noise barrier 5. In the embodiment shown according to FIG. 6, the two devices which are arranged on the two outer sides of the section are additionally connected to adjacent devices by means of screw or plug-in connection as a result of the arrangement of the sections in rows.

FIG. 7 shows another diagrammatic view of the second embodiment, wherein only two fins are indicated by dashed lines. The other fins are not shown for simplicity in order to make the structure of the frame 1 of the second embodiment clear. In the second embodiment shown according to FIGS. 6 and 7, the frames 1 are fastened to the uprights 4 of the noise barrier 5 with the aid of the supporting projections 6 and spacers 7 so that a simple assembly of the device according to the invention is illustrated.

Figure 8:
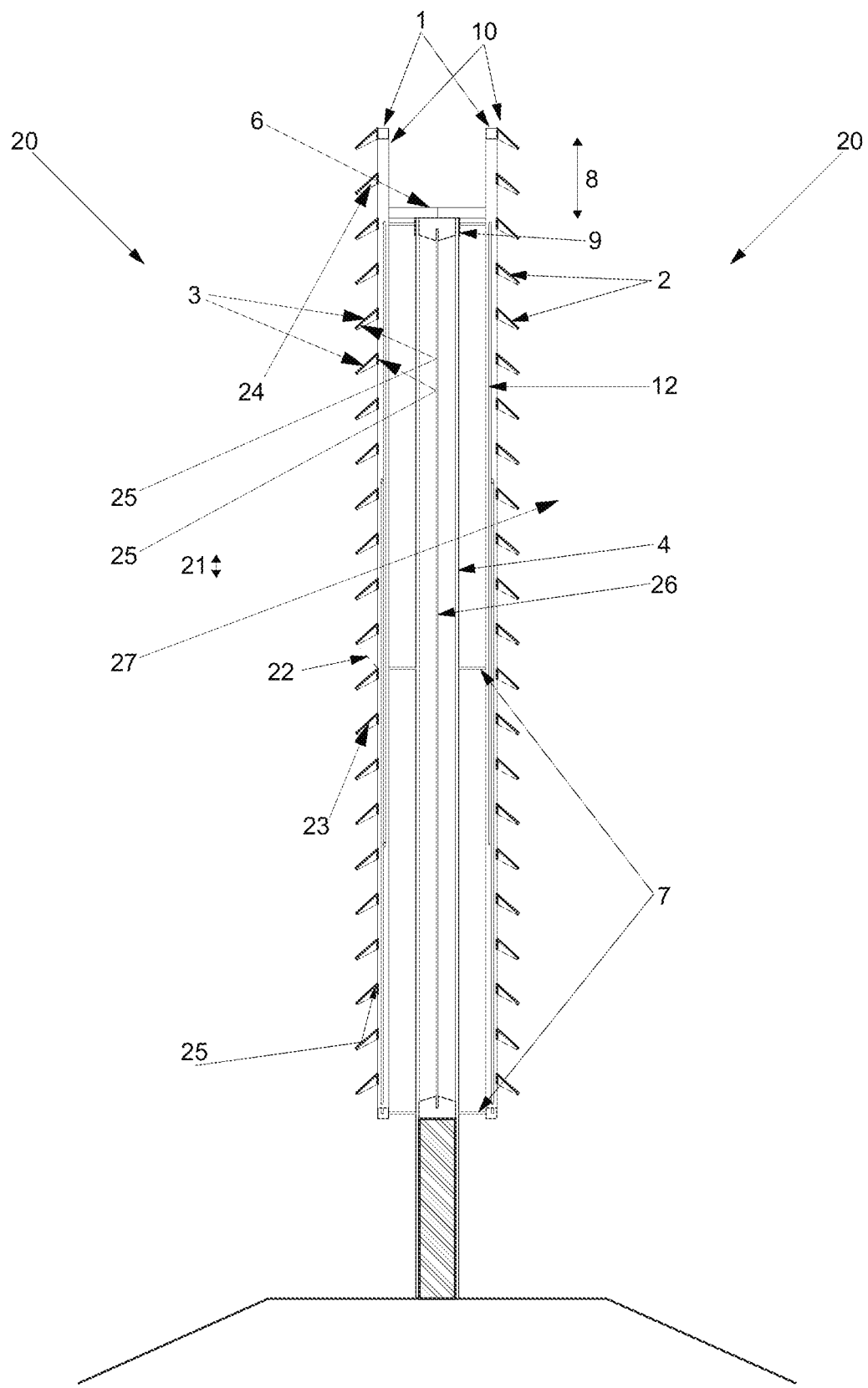
FIG. 8 shows schematically a vertical section of a third embodiment of the invention with a transparent noise barrier with presently disclosed devices arranged on both sides.
Figure 9:
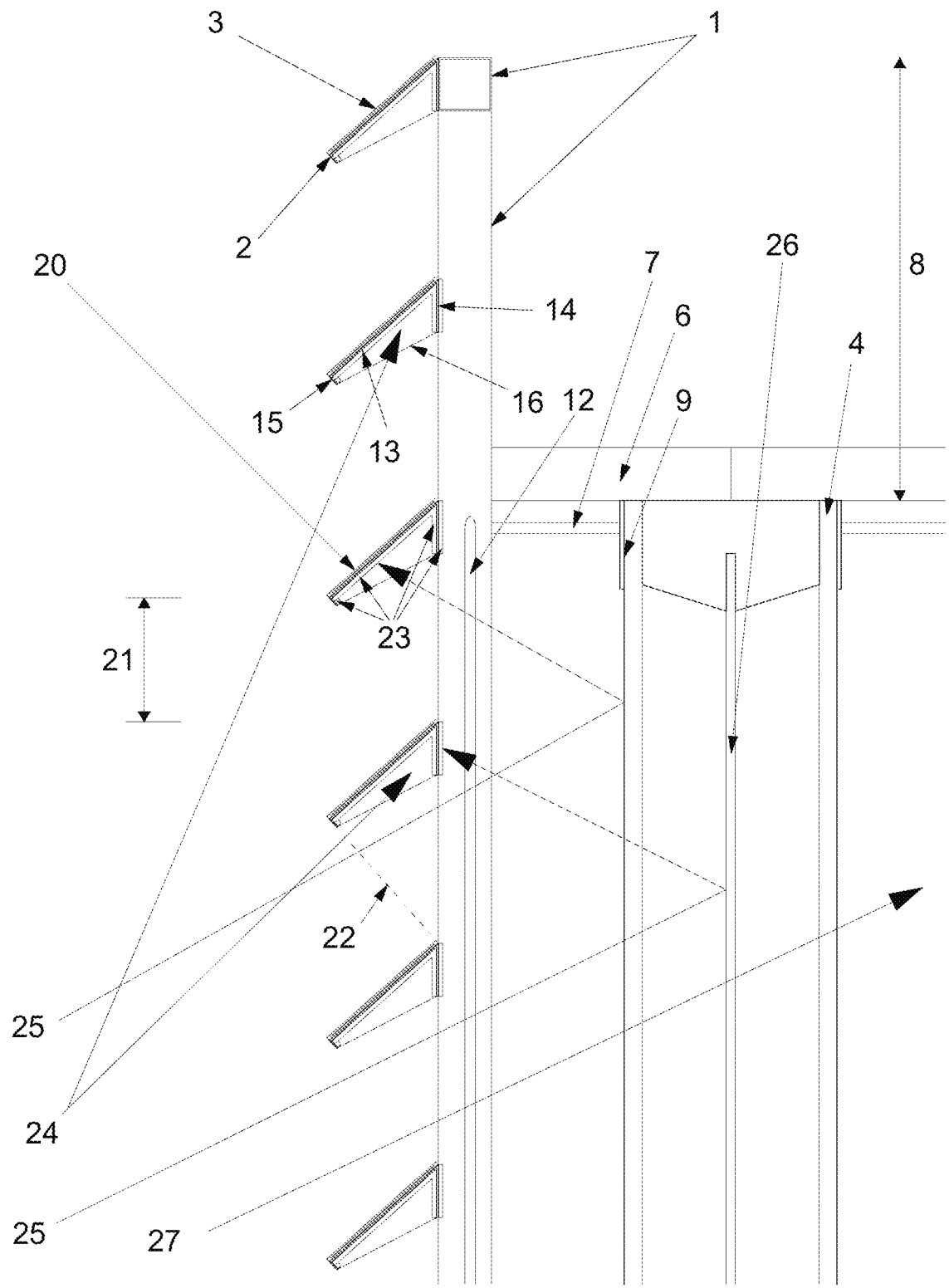
FIG. 9 shows schematically a detail of the vertical section according to FIG. 8.

FIG. 8 shows schematically a vertical section of a third embodiment of the invention and FIG. 9 shows schematically a detail of the vertical section of the third embodiment in the region of an upper edge of the noise barrier 5. In the third embodiment the noise barrier 5 has a transparent region 26 between the uprights 4. The transparent region 26 of the noise barrier 5 is sound-reflecting so that sound can be absorbed by the sound-absorbing coating 23 of the fins, which sound is emitted by the sound source, reflected in the region 26 and absorbed by the fins. In consequence, the sound reflected by the noise barrier 5 is indirectly incoming sound 25. By attaching the device according to the invention, sound-reflecting noise barriers such as transparent noise barriers can be designed or retrofitted to be sound-absorbing. As a result, new transparent noise barriers also can be used, for example, in those areas of roads and rails in which as a result of the negative sound-reflecting properties of the transparent noise barriers, these had only been possible hitherto to a limited extent. As a result of the inclined arrangement of the fins 2, non-transparent commercially available solar cells can be used with transparent noise barriers without needing to lose the transparent property from the viewing direction of the observer 27 of the noise barriers.

The invention claimed is:

1. A device for vertical attachment to a wall, comprising a frame and at least two fins with solar panels arranged on a front side of the frame, wherein the frame comprises at least two vertical frame elements, wherein at least two supporting projections, each having a bearing for receiving vertical loads and supporting the frame, extend outwards from a rear side of the frame, wherein the frame has at least one tension diagonal and the fins are each fastened to the at least two vertical frame elements, and wherein the fins are coated with a sound-absorbing surface and/or covered with a sound-absorbing material at least in sections.

2. The device according to claim 1, wherein the fins are arranged substantially parallel.

3. The device according to claim 1, wherein at least three fins with solar panels are arranged on the front side of the frame at equal distances.

4. The device according to claim 1, characterized in that the solar panels are arranged on the fins at an oblique angle in relation to a frame plane.

5. The device according to claim 1, wherein the fins each have at least one bracing which is angled in relation to the solar panel.

6. The device according to claim 1, wherein lugs projecting laterally of the bearing are provided on the supporting projections for connection to a support, wherein the lugs are arranged parallel to the frame plane.

7. The device according to claim 1, wherein at least one spacer extends from the rear side of the frame outwards.

8. The device according to claim 1, wherein the frame is formed from moulded tubes and/or angles.

9. The device according to claim 1, wherein the supporting projections are adapted for connection to corresponding supporting projections of a second device of the same type.

10. The device according to claim 9, wherein the supporting projections are adapted to produce a screw and/or plug-in connection.

11. A wall, comprising the device according to claim 1 mounted thereon.

12. A wall, comprising two of the devices according to claim 9 mounted and connected thereon.

13. The wall according to claim 11, wherein the wall is at least partially transparent.

14. A device for vertical attachment to a wall, comprising a frame and at least two fins with solar panels arranged on a front side of the frame, wherein the frame comprises at least two vertical frame elements, wherein at least two supporting projections, each having a bearing for receiving vertical loads and supporting the frame, extend outwards from a rear side of the frame, wherein the frame has at least one tension diagonal and the fins are each fastened to the at least two vertical frame elements, and wherein the supporting projections are adapted for connection to corresponding supporting projections of a second device of the same type.

15. The device according to claim 14, wherein the supporting projections are adapted to produce a screw and/or plug-in connection.

16. A wall with two of the devices according to claim 14 mounted and connected thereon.

17. The wall according to claim 16, wherein the wall is a noise barrier.

18. A wall with a device for vertical attachment to the wall, the device mounted on the wall and comprising a frame and at least two fins with solar panels arranged on a front side of the frame, wherein the frame comprises at least two vertical frame elements, wherein at least two supporting projections, each having a bearing for receiving vertical loads and supporting the frame, extend outwards from a rear side of the frame, wherein the frame has at least one tension diagonal and the fins are each fastened to the at least two vertical frame elements, and wherein the wall is at least partially transparent.

* * * * *